United States Patent Office 3,156,627
Patented Nov. 10, 1964

3,156,627
CARAMELIZED GLUCOSE IN GLUTAMIC ACID PRODUCTION
Guido M. Miescher, Terre Haute, Ind., assignor to Commercial Solvents Corporation, New York, N.Y., a corporation of Maryland
No Drawing. Filed Aug. 4, 1961, Ser. No. 129,257
8 Claims. (Cl. 195—47)

My invention relates to the production of glutamic acid; and more particularly, it relates to an improvement in the method of producing glutamic acid by the fermentation of nutrient fermentation media with the organism *Brevibacterium divaricatum*.

Previously it has been shown that glutamic acid has been successfully prepared by fermentation utilizing the organism *Brevibacterium divaricatum*. It has been shown, furthermore, that very simple media contaning only chemically defined ingredients such as sugar, minerals, and a source of growth factor can be utilized. Such media have the great advantage of facilitating the recovery process to a great extent due to the lack of any unwanted impurities.

In such a medium, however, this organism does not start growing readily and sometimes can even lead to a complete failure of the fermentation. This is a decided disadvantage in the commercial production of glutamic acid, since much time is wasted in waiting for the organism *Brevibacterium divaricatum* to grow. Fermentations being essentially the equivalent of batch chemical processes, it can be readily seen that much valuable equipment is tied up waiting for the organism to start growing that could otherwise be used to good advantage. Or even worse, at times the organism never starts growing and the while nutrient mixture must be discarded.

I have now discovered a process whereby the growth of the organism *Brevibacterium divaricatum* can be initiated rapidly in fermentation media utilizing pure sugars.

Essentially, my novel process comprises adding a small amount of caramelized glucose to the fermentation medium.

My process applies to glutamic acid producing strains of the organism *Brevibacterium divaricatum* such as NRRL B–2311, and NRRL B–2312 which have been deposited with the Northern Regional Research Laboratories of the United States Department of Agriculture.

My new process for the production of glutamic acid comprises incubating the organism *Brevibacterium divaricatum* in an aqueous nutrient medium, the said medium containing small amounts of caramelized glucose. The fermentation is preferably carried out at temperatures ranging from about 28 to about 36° C., at a pH range of from about 7.0 to about 8.0, under submerged conditions of agitation and aeration. Carbohydrates, useful for the production of glutamic acid by my new process, include sucrose, fructose, and glucose. In addition to the carbohydrates the nutrient media require the presence of a nitrogen source in either organic or inorganic form such as urea, ammonium salts such as ammonium chloride, ammonium sulfate, and ammonium tartrate. Also, a source of potassium and phosphorus such as dipotassium phosphate is required for suitable yields, as are trace mineral sources containing such elements as manganese, magnesium, iron, etc., in compounds such as magnesium sulfate, ferrous sulfate, manganese sulfate, etc.

In addition to the above constituents of the fermentation medium, it is necessary to include a growth promoter such as biotin. Alternatively, other growth promoters can be employed such as for example, oleic acid, linoleic acid, and linolenic acid as described in my co-pending application Serial No. 104,820. These growth promoters allow the organism to achieve a good level of growth, while the growth initiator of my present invention allows cell growth to start and proceed to the anticipated level. Without the growth promoters present in the fermentation medium, the growth initiator of my invention would have little effect.

In carrying out the process of my invention I have found that very little caramelized glucose need be added to the fermentation medium for it to act as a growth initiator. Amounts as little as from 0.02 to 0.5% by volume of caramelized glucose per volume of fermentation medium have given excellent results.

One method of making caramelized glucose is to autoclave glucose with ammonia and neutralize the resulting product. For example, one specific method by which I have prepared my caramelized glucose growth initiator is by autoclaving glucose with aqueous ammonium hydroxide for a short period of time under pressure. The resultant autoclaved material is then neutralized to a pH of about 7.3 with sulfuric acid.

It is understood that the examples given below are for the purposes of illustration only, and I do not intend to be limited to the specific ingredients or amounts thereof or to the other specific operating conditions other than previously broadly set forth herein.

*Example I*

A standard sucrose basal fermentation medium was prepared containing by volume 10% sucrose, 0.1% $KH_2PO_4$, 0.1% $K_2SO_4$, 0.05% $MgSO_4$, eight parts per million $FeSO_4$, four parts per million $MnSO_4$, 0.8% urea, and 10 micrograms per liter of biotin. The basic medium was placed in 500 ml. flasks and inoculated with *Brevibacterium divaricatum* NRRL B–2312. The urea was added incrementally to maintain the pH of the fermentation in the range of between about 7.0 and 8.0. A temperature of about 30° C. was maintained throughout the incubation and the flasks were agitated by a rotary action shaker. Some fermentations contained the caramelized glucose of my invention and some did not. The growth of the organism *Brevibacterium divaricatum* NRRL B–2312 was determined by observing the light transmittancy of the fermentation medium. Light transmittancy diminished with the growth of the organism. Very little, or no growth of glutamic-producing organisms was observed in the medium that did not contain caramelized glucose. In media containing as little as two drops of caramelized glucose prepared as described below, glutamic acid producing organisms grew very rapidly and in large quantities. The caramelized glucose was prepared by autoclaving 10 grams of glucose with one milliliter of 30% aqeuous ammonium hydroxide for 15 minutes under 15 pounds per square inch of pressure. The resultant autoclaved material was at a pH of 7.8 and was then neutralized to a pH of 7.3 with sulfuric acid.

*Example II*

The procedure of Example I was repeated with the exception that glucose was substitued for sucrose in the basal fermentation medium. Results similar to those of Example I were obtained.

*Example III*

The procedure of Example I was repeated with the exception that fructose was substituted for sucrose in the basal fermentation medium. Results similar to those of Example I were obtained.

*Example IV*

The procedure of Example I was repeated with the exception that *Brevibacterium divaricatum* NRRL B–2311 was substituted for *Brevibacterium divaricatum* NRRL B–2312. Results similar to those of Example I were obtained.

Example V

The procedure of Example II was repeated with the exception that *Brevibacterium divaricatum* NRRL B-2311 was substituted for *Brevibacterium divaricatum* NRRL B-2312. Results similar to those of Example II were obtained.

Example VI

The procedure of Example III was repeated with the exception that *Brevibacterium divaricatum* NRRL B-2311 was substituted for *Brevibacterium divaricatum* NRRL B—2312. Results similar to those of Example III were obtained.

Now having described my invention, what I claim is:

1. In a process for the production of glutamic acid by cultivating glutamic acid producing strains of the organism *Brevibacterium divaricatum* in an aqueous nutrient medium containing a pure sugar source, a nitrogen source, a mineral source, and a growth promoting material, the improvement which comprises carrying out the fermentation in the presence of caramelized glucose in small amounts sufficient to initiate growth of said *Brevibacterium divaricatum*.

2. A process for the production of glutamic acid by cultivating glutamic acid producing strains of the organism *Brevibacterium divaricatum* in an aqueous nutrient medium containing a pure sugar source, a nitrogen source, a mineral source, and a growth promoting material selected from the group consisitng of biotin, oleic acid, linoleic acid, and linolenic acid, the improvement which comprises carrying out the fermentation in the presence of caramelized glucose in small amounts sufficient to initiate growth of said *Brevibacterium divaricatum*.

3. The process of claim 2 wherein the pure sugar source is sucrose.

4. The process of claim 2 wherein the pure sugar source is glucose.

5. The proces of claim 2 wherein the pure sugar source is fructose.

6. The process of claim 2 wherein the strain of *Brevibacterium divaricatum* is NRRL B-2311.

7. The process of claim 2 wherein the strain of *Brevibacterium divaricatum* is NRRL B-2312.

8. The process of claim 2 wherein the amount of caramelized glucose is from about 0.02% to about 0.5% by volume of fermentation medium.

References Cited in the file of this patent

UNITED STATES PATENTS

| | | |
|---|---|---|
| 2,978,383 | Yamada | Aug. 4, 1961 |
| 2,978,384 | Yamada | Aug. 4, 1961 |
| 3,002,889 | Kinoshita et al. | Oct. 3, 1961 |

OTHER REFERENCES

Kato et al.: Chemical Abstracts 49, 11077C (1955), 51, 12212a (1957).